United States Patent
Misawa et al.

(10) Patent No.: US 7,857,495 B2
(45) Date of Patent: Dec. 28, 2010

(54) VEHICLE LIGHTING SYSTEM INCLUDING A LIGHT GUIDING MEMBER

(75) Inventors: Akihiro Misawa, Aichi-ken (JP); Yoshiharu Tanaka, Aichi-ken (JP); Tatsuya Oba, Aichi-ken (JP); Shinya Watanabe, Seto (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 149 days.

(21) Appl. No.: 11/698,996

(22) Filed: Jan. 29, 2007

(65) Prior Publication Data

US 2007/0195540 A1 Aug. 23, 2007

(30) Foreign Application Priority Data

Jan. 30, 2006 (JP) .............................. 2006-020592
Dec. 19, 2006 (JP) .............................. 2006-340716

(51) Int. Cl.
*G02B 6/42* (2006.01)
*F21V 8/00* (2006.01)
*F21V 13/04* (2006.01)

(52) U.S. Cl. ..................... 362/511; 362/327; 362/308; 362/518; 362/621; 362/625; 362/628

(58) Field of Classification Search ......... 362/543–544, 362/545, 555, 512, 26, 505, 330, 560, 334–340, 362/520–522, 509–511, 27, 621–628, 608–610, 362/612, 561, 97.1–97.4, 308, 327; 385/146; 359/831, 837

See application file for complete search history.

(56) References Cited

U.S. PATENT DOCUMENTS

| | | | | |
|---|---|---|---|---|
| 4,929,866 A * | 5/1990 | Murata et al. | ............... | 313/500 |
| 6,880,960 B2 * | 4/2005 | Mishimagi | .................. | 362/511 |
| 7,281,833 B2 * | 10/2007 | Akiyama | ..................... | 362/545 |
| 7,334,923 B2 * | 2/2008 | Tanaka et al. | ............... | 362/494 |
| 7,410,280 B2 * | 8/2008 | Erber | ......................... | 362/520 |
| 2003/0123262 A1* | 7/2003 | Suehiro et al. | ............. | 362/555 |
| 2003/0169600 A1* | 9/2003 | Amano | ........................ | 362/545 |
| 2003/0193815 A1* | 10/2003 | Mishimagi | .................. | 362/522 |
| 2003/0210540 A1* | 11/2003 | Yamada et al. | ................ | 362/31 |
| 2003/0235046 A1* | 12/2003 | Chinniah et al. | .............. | 362/31 |
| 2004/0207999 A1* | 10/2004 | Suehiro et al. | ............... | 362/84 |
| 2004/0257790 A1* | 12/2004 | Tanaka et al. | ................. | 362/23 |
| 2009/0027911 A1* | 1/2009 | Misawa et al. | ............. | 362/518 |

FOREIGN PATENT DOCUMENTS

JP        2005-123092        5/2005

* cited by examiner

*Primary Examiner*—Alan Cariaso
(74) *Attorney, Agent, or Firm*—McGinn IP Law Group, PLLC

(57) ABSTRACT

A vehicle lighting system having: a light guiding member having a front face as a light emitting surface, a rear face having a plurality of reflecting portions inclined to the front face, and a side face; and a light source disposed opposite to the side face. An angle θ defined between the front face and the side face is designed such that, of external lights to enter into the light guiding member, a light to travel directly to the side face can be totally reflected on an interface of the side face.

20 Claims, 6 Drawing Sheets

VEHICLE LIGHTING SYSTEM INCLUDING A LIGHT GUIDING MEMBER

The present application is based on Japanese patent application Nos. 2006-020592 and 2006-340716, the entire contents of which are incorporated herein by reference.

BACKGROUND OF THE INVENTION

1. Field of the Invention

This invention relates to a vehicle lighting system and, in particular, to a vehicle lighting system such as a rear combination lamp with improved visual effects.

2. Description of the Related Art

A rear combination lamp and a high mount stop lamp as a vehicle lighting system are constructed such that light emitted from a light source is externally radiated via an outer lens (i.e., a design cover). FIG. 6 shows a rear combination lamp 100 with an LED (i.e., light emitting diode, herein called LED) lamp as a light source. As shown, the LED lamp 102 is disposed inside an outer lens 101 and a reflector 103 is disposed around the LED lamp 102 (See JP-A-2005-123092). In operation, a light from the LED lamp 102 is radiated frontward directly or via the reflector 103 and is then radiated externally through the outer lens.

However, the conventional vehicle lighting system has problems as described below.

For example, in the rear combination lamp using the LED lamp as a light source, it is not preferred that the LED lamp can be directly viewed from outside, except when it is preferable in design aspect to show the existence of the LED lamp positively. Therefore, measures to hide the LED lamp may be taken in which a light diffusion finish (e.g., formation of fine grooves) is provided on the outer lens or the shape of the reflector is modified to reduce unevenness in brightness. However, even with the measures, it is very difficult to perfectly hide the LED lamp from the sight of a viewer since the LED lamp is placed behind the outer lens and can thus lie in the line of sight of the viewer.

SUMMARY OF THE INVENTION

It is an object of the invention to provide a vehicle lighting system that can prevent effectively the direct visibility of a light source disposed in the system so as to improve its visual effects.

According to an exemplary aspect of the invention, a vehicle lighting system comprises:

a light guiding member comprising a front face as a light emitting surface, a rear face comprising a plurality of reflecting portions inclined to the front face, and a side face; and a light source disposed opposite to the side face, wherein an angle θ defined between the front face and the side face is designed such that, of external lights to enter into the light guiding member, a light to travel directly to the side face can be totally reflected on an interface of the side face.

In the above invention, the following modifications and changes can be made.

(i) The light to travel directly to the side face of the external lights is always totally reflected on the interface of the side face.

(ii) The angle θ meets the relationship:

θ>2 sin⁻¹(1/n)

(iii) The angle θ meets the relationship:

θ>2 sin⁻¹(1/n)−10°.

(iv) A mirror image of the light source mirrored on the plurality of the reflecting portions can be viewed via the front face from outside.

(v) A light to enter into the light guiding member via the side face from the light source can be irradiated to all of the plurality of the reflecting portions.

(vi) The plurality of the reflecting portions each comprise a convex curved surface.

(vii) The side face comprises an incidence plane through which a light from the light source enters into the light guiding member, and a non-incidence plane which connects the incidence plane and the front face and through which the light from the light source does not enter into the light guiding member.

(viii) The incidence plane is inclined relative to the non-incidence plane such that an angle defined between the incidence plane and the non-incidence plane is reduced.

(ix) The incidence plane comprises a smooth surface.

(x) A distance of the front face and the rear face is continuously or stepwise decreased with distance from the side face.

(xi) The side face comprises a thickness of 15 mm to 50 mm.

(xii) The front face comprises a convex curved surface.

(xiii) The light guiding member comprises nearly a triangle form in section.

(xiv) The light guiding member is placed such that the side face is located at a bottom of the light guiding member.

(xv) The light source comprises an LED (light emitting diode) lamp.

ADVANTAGES OF THE INVENTION

In the invention, of external lights to enter into the light guiding member via its front light emitting surface, a light to travel directly to the side face of the light guiding member can be totally reflected. Owing to the total reflection for the external light, the light source is hard to view directly via the front light-emitting face of the light guiding member. In other words, the vehicle lighting system of the invention can prevent the light source from being directly viewed via the front light emitting surface (or front face) of the light guiding member. Thus, in accordance with the invention, the vehicle light system can prevent effectively the direct visibility of the light source disposed in the system so as to improve its visual effects albeit it has a simple structure.

BRIEF DESCRIPTION OF THE DRAWINGS

The preferred embodiments according to the invention will be explained below referring to the drawings, wherein:

FIG. 4 is an illustration showing an angle between a front face 12 of a light guiding member and an incidence plane 15a;

FIG. 5 is a perspective view showing a rear combination lamp in another exemplary embodiment according to the invention, where a light guiding member 11a is provided with an inclined incidence plane 15a.

DETAILED DESCRIPTION OF THE PREFERRED EMBODIMENTS

A vehicle lighting system of the invention is adapted to reflect a light to enter into a light guiding member from a light source by a reflecting portion disposed on the side of a rear face of the light guiding member to convert it into a light to travel to a front face of the light guiding member. Thereby, the light can be finally radiated from the front face of the light guiding member. Thus, the vehicle lighting system of the invention has, as a light emitting surface which corresponds to an external surface of the lighting system, the front face of the light guiding member. As such, when the vehicle lighting system is viewed from outside, the front face of the light guiding member can be directly viewed as the light emitting surface without involving cover members.

Figure 2:
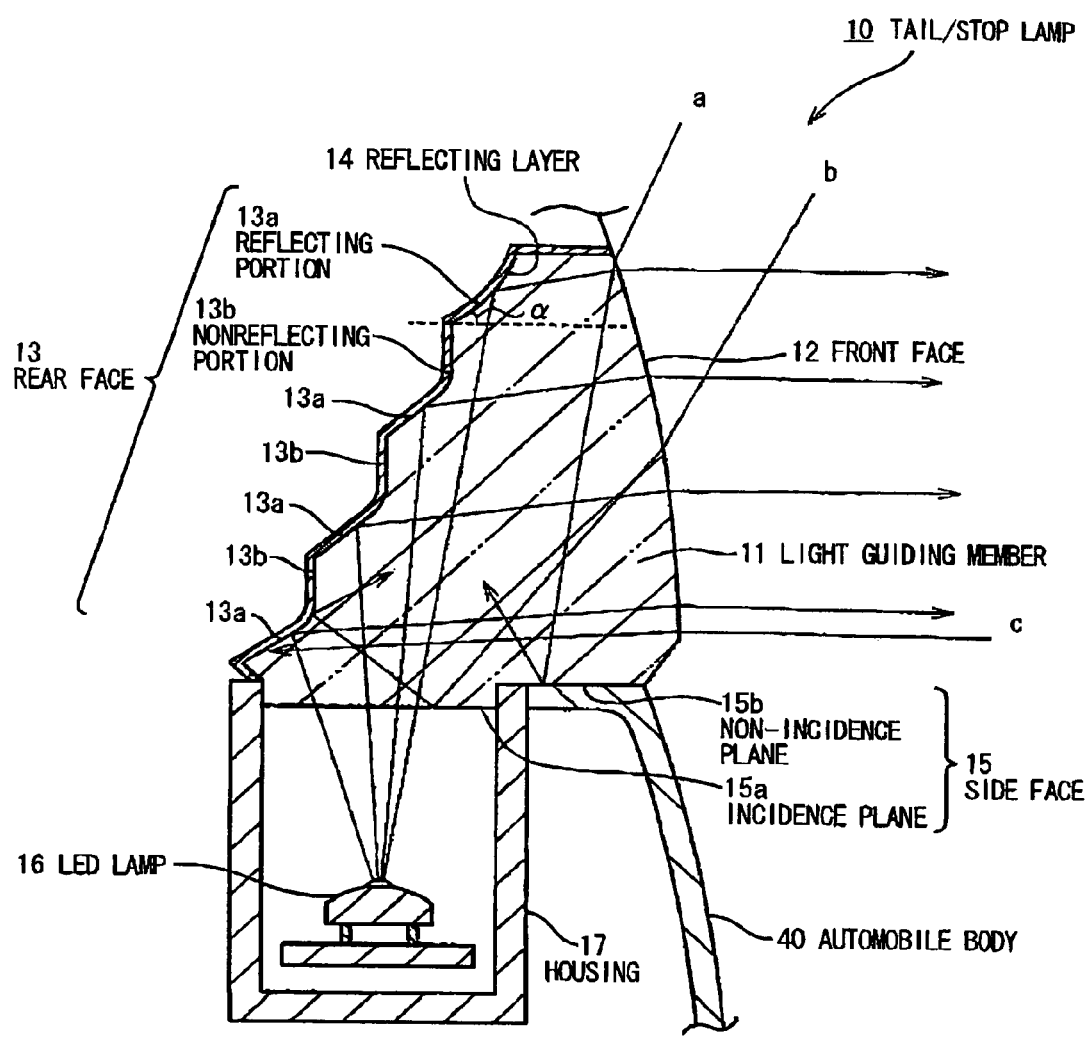
FIG. 2 is a cross sectional view cut along a line A-A in FIG. 1, detailing the structure of a tail/stop lamp 10 in FIG. 1.

In the vehicle lighting system of the invention, light from the light source enters into a side face of the light guiding member. Thus, the side face of the light guiding member corresponds to an incidence plane. A part of the side face may be used as the incidence plane. For example, as shown in FIG. 2, of the side face, a portion on the backside of the light guiding member can be used as the incidence plane. In this case, the incidence plane is connected through a plane (i.e., a non-incidence plane) to the front face of the light guiding member. By thus separating the incidence plane from the light emitting surface (i.e., front face), the distance of the light emitting surface (i.e., front face) and the rear face can be adjusted arbitrarily. Therefore, design freedom of the light guiding member can be increased. For example, the area of the reflecting portion disposed on the rear face or the area of the light emitting face (i.e., front face) can be increased or decreased.

The rear face of the light guiding member is provided with a light reflection treatment so as to form the plural reflecting portions. Thus, light travels to the front face (i.e., light emitting surface) by the reflection function of the reflecting portion. It is desirable that the distance of the front face (i.e., light emitting surface) of the light guiding member and the rear face is decreased continuously or stepwise with distance from the side face in order to reduce unevenness in brightness of light radiated from the light emitting surface. By thus designing, light extraction efficiency can be increased at a position distant from the light source to reduce the unevenness in brightness of the radiated light.

The light reflection treatment on the rear face of the light guiding member can be achieved by, e.g., deposition, plating or sputtering of a metal material such as aluminum, silver and chromium or by attaching a metal film. Alternatively, the rear face of the light guiding member may be roughened or provided with grooves at a predetermined pattern.

When looking the light guiding member from outside, the reflecting portion formed on the rear face can be viewed through the light emitting surface. Therefore, the reflecting portion (or surface) becomes an important element to compose the design (or visual appearance) of the vehicle lighting system of the invention. By providing an excellent design with the reflecting portion, the visual appearance of the light system can be enhanced. For example, concave portions may be continuously formed in a pattern on the rear face of the light guiding member. Further, by providing the rear face with the above reflection treatment, the reflecting portion (or surface) can be formed with the continuously-formed concave portions. As such, since the form of the reflecting portion (or surface) is determined depending on that of the rear face of the light guiding member, the reflecting portion (or surface) can be easy formed with a desired form.

The light guiding member used for the invention has a thickness (which corresponds to the distance of the front face and the rear face) of 15 mm to 50 mm, preferably 25 mm to 40 mm, on the side of side face as the incidence plane. If the thickness is less than 15 mm, light introduction efficiency may lower or failure in light introduction may occur. If the thickness is more than 50 mm, the light guiding member becomes thick beyond necessity to cause an increase in weight and manufacturing cost. On the other hand, the light guiding member has a thickness of 3 mm to 20 mm, preferably 5 mm to 10 mm, on the other end (which is most distant from the side face and opposite to the side face). By using the thick light guiding member, the light source can be effectively prevented from being looked from outside through the light guiding member.

The number of the light source used can be determined in consideration of brightness needed for the lighting system. The plural light sources are generally used and arrayed, e.g., in a row along the side face of the light guiding member.

The light source is not limited to a special kind and can be an LED lamp, a bulb etc. Especially the LED lamp is preferable. This is because the lighting system can be downsized since the LED lamp is very small. Furthermore, it is advantageous in that it generates a small amount of heat to reduce thermal influence to peripheral members. The LED lamp is not limited to a special kind and can be formed of various types such as bullet-type and chip type. Especially an LED lamp with high directivity such as one with a condensing lens is preferable.

The color of the light source can be selected optionally. The plural light sources may be used and controlled to change illumination color.

Exemplary Embodiments

The exemplary embodiments of the invention will be explained below.

Figure 1:
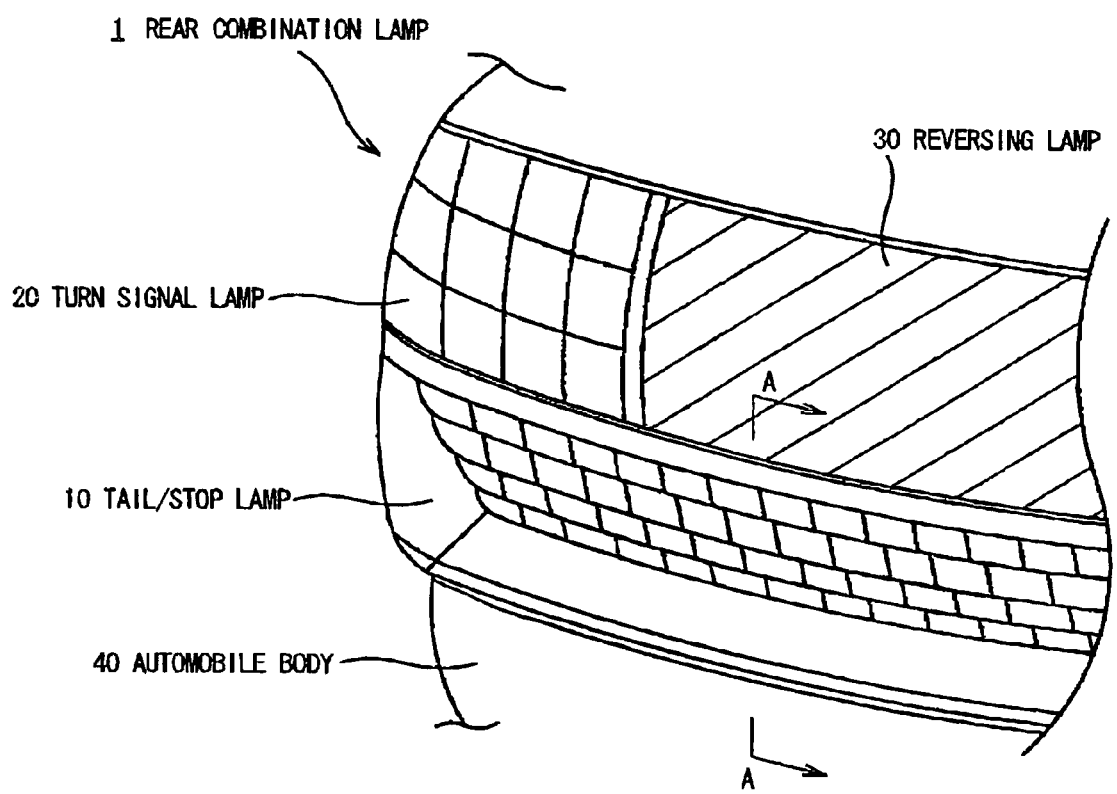
FIG. 1 is a perspective view showing a rear combination lamp in an exemplary embodiment according to the invention.

FIG. 1 is a perspective view showing a rear combination lamp in an exemplary embodiment according to the invention.

The rear combination lamp 1 comprises a tail/stop lamp 10 to function as a tail lamp and a stop lamp, a turn signal lamp 20 to give a turn signal, and a reversing lamp 30 to give a reverse signal. The rear combination lamp 1 also includes an automobile body 40.

FIG. 2 is a cross sectional view cut along a line A-A in FIG. 1. As shown in FIG. 2, the tail/stop lamp 10 comprises a light guiding member 11 formed of an acrylic resin with a refractive index of about 1.5, and an LED lamp 16 disposed under the light guiding member 11. The light guiding member 11 is nearly triangle in cross section. A front face (or light emitting surface) 12 of the light guiding member 11 is formed with a convex face curved gently. The convex face has a curvature radius of about 400 mm to 600 mm. A rear face 13 of the light guiding member 11 is formed stepwise in an orderly manner. In detail, the rear face 13 comprises a reflecting portion 13a whose interface to a reflecting layer described later is inclined to the front face 12, and a nonreflecting portion 13b connecting the two neighboring reflecting portions 13a, where the reflecting portion 13a and the nonreflecting portion 13b are formed alternately such that the light guiding member 11 is reduced in thickness from one end (i.e., side face) to the other end. The light guiding member 11 has a thickness (i.e., distance of the front face and the rear face in the horizontal direction) of about 30 mm at the thickest section and about 10 mm at the thinnest section. The height (i.e., distance from one end to the other end in the vertical direction) of the light guiding member 11 is about 40 mm.

The reflecting layer 14 formed of an aluminum material by deposition is formed over the entire rear face 13 of the light guiding member 11. The reflecting layer 14 causes efficient reflection of light at the reflecting portion 13a. When the LED lamp 16 is turned off, the reflecting layer 14 can be viewed from outside such that the tail/stop lamp 10 has a metallic texture.

In this embodiment, the reflecting portion 13a composes a convex face (or reflecting surface) that is inclined at a predetermined angle to an incidence plane 15a described later. In cross section, an angle α between the convex face and the incidence plane 15a is about 40° to 50° (See FIG. 2) The surface of the nonreflecting portion 13b is nearly perpendicular to the incidence plane 15a in cross section. The form and angle of the reflecting portion 13a and the nonreflecting portion 13b are determined in consideration of 10 the light distribution characteristics of the tail/stop lamp 10. The reflecting portion 13a is designed such that light from the LED lamp 16 can be irradiated to all the reflecting portions 13a. All the reflecting portions 13a do not have always the same form/angle. The same goes for the nonreflecting portion 13b.

The side face 15 connecting the front face 12 and the rear face 13 of the light guiding member 11 is sectioned into two regions, i.e., the incidence plane 15a and a non-incidence plane 15b by a step formed midway therebetween (See FIG. 2). The LED lamp 16 is disposed opposite to the incidence plane 15a. The incidence plane 15a is thus placed distant from the front face 12 so that the distance of the front face 12 and the rear face 13 can be adjusted optionally. Therefore, design freedom of the light guiding member 11 can be enhanced.

The LED lamp 16 is disposed under the light guiding member 11 so as to reduce the thickness (in the horizontal direction of FIG. 2) of the tail/stop lamp 10. Thereby, the design characteristic can be enhanced.

Although in this embodiment the plural LED lamps 16 are arrayed in a row along the region, the arrangement form thereof is not limited to this. In this embodiment, the LED lamp 16 is a red LED lamp. The LED lamp used for the light source is small in power consumption and heat generation. It has a long service life since it is impervious to vibration or shock. Further, since it is very small, it only requires a small space for light source to achieve reduction in size and weight of the rear combination lamp. The LED lamp 16 is controlled by a known control circuit (not shown) in flashing. 17 is a housing for the LED lamp 16, and is formed of a synthetic resin etc. The housing 17 can be positioned and fixed by using the step formed at the side face 15 of the light guiding member 11.

The operation of the tail/stop lamp 10 when turning on the LED lamp 16 in response to an input signal from the vehicle will be described below.

First, light emitted from the LED lamp 16 is irradiated to the incidence plane 15a of the light guiding member 11 and introduced into there. The light introduced travels inside of the light guiding member 11 by its light-guiding function. Then, the light is reflected on the reflecting portion 13a formed on the rear face of the light guiding member 11 to produce a light advancing to the front face 12 of the light guiding member 11. The light thus produced is radiated outside from the front face 12 of the light guiding member 11 to make a predetermined illumination display (or signaling).

Figure 3:
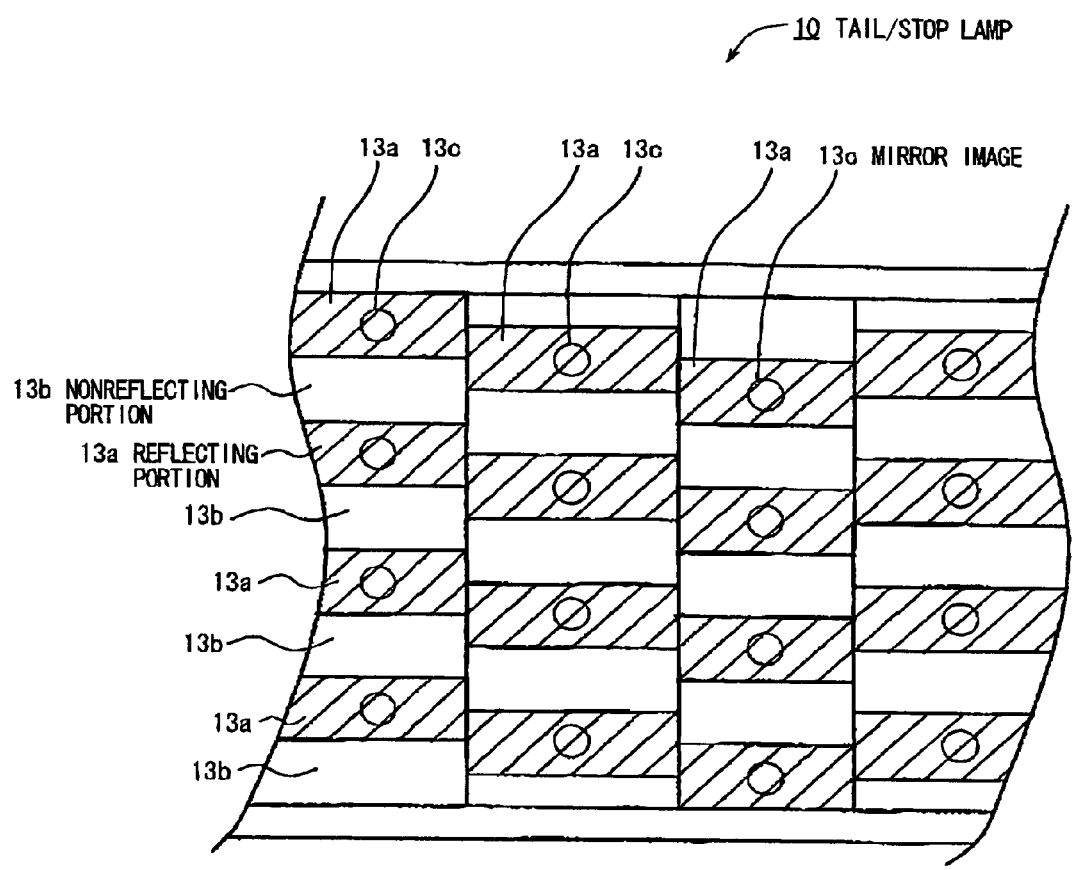
FIG. 3 is an illustrative plain view showing the tail/stop lamp 10 in its lighting (or turn-on) state.

FIG. 3 is an illustrative plain view showing the tail/stop lamp 10 in its lighting (or turn-on) state. As shown, in the vertical direction, a region (i.e., reflecting portion 13a) to be illuminated and a region (i.e., nonreflecting portion 13b) to be not illuminated appear alternately. In the reflecting portion 13a, a mirror image 13c of the LED lamp 16 can be looked. The reflecting portion 13a formed with the convex face functions as a convex mirror (or diminishing lens) to mirror a wide range. Therefore, the whole mirror image of the LED lamp 16 can be mirrored on the reflecting portion 13a. As such, all the reflecting portions 13a can mirror the whole mirror image of the LED lamp 16 to enhance the visual effects of the light system.

As seen from FIG. 3, the reflecting portions 13a are arrayed in the lateral direction while each being displaced half the height of the reflecting portion 13a from the adjacent one in the vertical direction. By using this structure, the depth of steps formed on the rear face 13 of the light guiding member 11 can be decreased to facilitate the molding of the light guiding member 11.

The amount of light reaching the reflecting portion 13a is generally reduced with distance from the LED lamp 16. However, since the thickness of the light guiding member 11 is reduced stepwise according to the distance from the LED lamp 16, the light extraction efficiency can be enhanced at the light amount-reducing position so that the entire brightness of the lighting system can be equalized. In addition, since light from the LED lamp 16 can be irradiated to all the reflecting portions 13a, the entire brightness of the lighting system can be further equalized.

The tail/stop lamp 10 is constructed such that the light source is not disposed behind the rear face 13 of the light guiding member 11 (as in the conventional lighting system), but disposed opposite to the incidence plane 15a of the light guiding member 11 (See FIG. 2). Further, as well as using the very thick light guiding member 11, the light guiding member 11 is designed such that, of external lights to enter into the light guiding member 11 via the front face 12, a light to travel directly to the incidence plane 15a can be totally reflected on the interface of the incidence plane 15a. Thereby, the LED lamp 16 can be prevented from being directly viewed via the light guiding member 11 from outside For example, when viewing from position a or position b as shown in FIG. 2, the LED lamp 16 cannot be viewed due to the total reflection on the front face 12 or the incidence plane 15a of the light guiding member 11 When viewing from position c, the reflecting layer 14 can be viewed but the LED lamp 16 cannot be perceived as in case of viewing from positions a and b.

Figure 4:
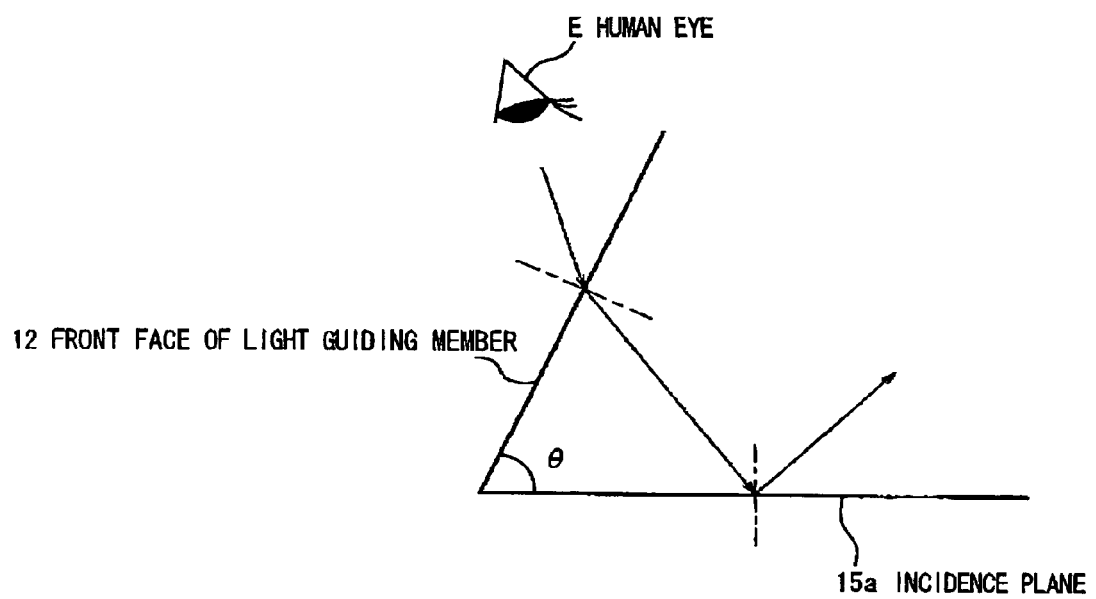

FIG. 4 is an illustration showing an angle between the front face 12 of the light guiding member and the incidence plane 15a with a human eye E focused on the front face 12 of the light guiding member. In order to cause the total reflection as mentioned herein, as shown in FIG. 4, the angle θ defined between the front face 12 and the incidence plane 15a of the light guiding member 11 needs to meet the following relationship:

$$\theta > 2\sin^{-1}(1/n)$$

where n is a refractive index of the light guiding member 11.

If the light guiding member 11 is designed to meet the above relationship (i.e., to have θ to meet the relationship) over the entire front face 12, the LED lamp 16 cannot be perceived even when viewing the direction of the LED lamp 16 (i.e., direction of the incidence plane 15a) through the front face 12, regardless of any positions of viewpoint. Thus, the LED lamp 16 can be prevented from being directly viewed via the front face of the light guiding member 11.

Although it is preferable to completely hide the existence of the LED lamp 16 as mentioned above, it does not matter in practical use that a part of the front face 12 does not meet the above relationship since the range of viewpoints of the viewer when using the rear combination lamp 1 is limited to a smaller range, e.g., it is not often in its practical use that the rear combination lamp 1 is viewed from position a in FIG. 2. In consideration of this, it is acceptable that the angle θ defined between the front face 12 and the incidence plane 15a of the light guiding member 11 meets the following relationship:

$$\theta > 2 \sin^{-1}(1/n) - 10°$$

Alternatively, on the front face 12 of the light guiding member 11, a region may be positively formed through which the LED lamp 16 can be directly viewed from outside. In this alternative, unpredictable quality can be offered such that the LED lamp 16 is suddenly viewed or suddenly hidden along with a change in viewpoint.

It is preferred that the incidence plane 15a has a smooth surface to increase the likelihood of the total reflection. By providing the incidence plane 15a with the smooth surface, light from the LED lamp 16 can be efficiently introduced into the light guiding member 11 and the travel direction of the light introduced can be aligned. Thus, it is preferable in aspects of light availability and light distribution control to provide the incidence plane 15a with the smooth surface.

In this embodiment, the good light distribution of the light introduced into the light guiding member 11 can be obtained by providing the incidence plane 15a with the flat surface. However, the form of the incidence plane 15a is not limited to the flat surface and may be, e.g., an arbitrary curved surface. Further, the incidence plane 15a may have a combination of different form faces.

As described above, the tail/stop lamp 10 is excellent in visual effects such that it can prevent the light source (i.e., the LED lamp 16) from being viewed from outside and it can reduce unevenness in brightness during the illumination. Meanwhile, the turn signal lamp 20 and the reversing lamp 30 are constructed by a colored cover and a bulb as a light source.

Figure 5:
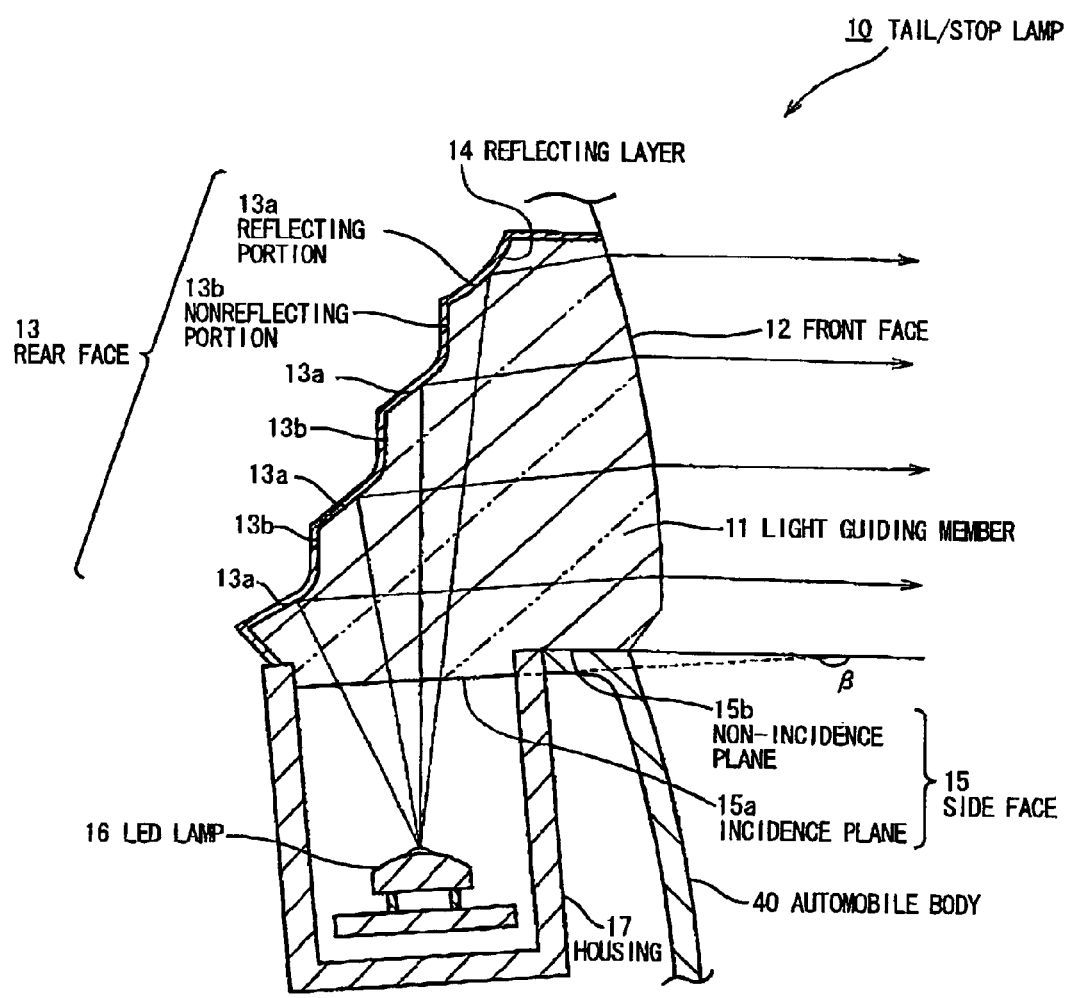
Figure 6:
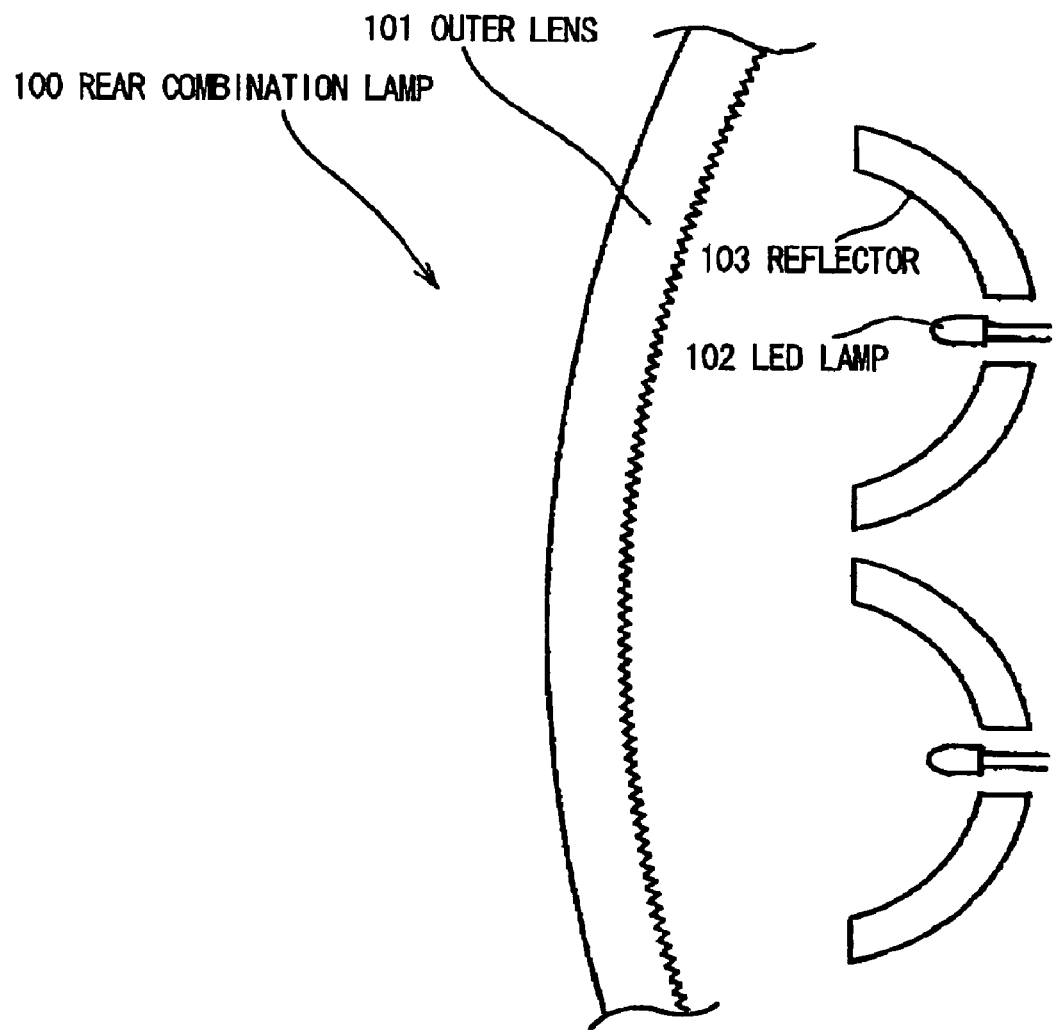
FIG. 6 is a schematic side view showing the conventional rear combination lamp.

FIG. 5 is a perspective view showing a rear combination lamp in another exemplary embodiment according to the invention. Although in the previous embodiment the incidence plane 15a is formed parallel to the non-incidence plane 15b, the incidence plane 15a may be inclined relative to the non-incidence plane 15b. As shown in FIG. 5, the incidence plane 15a is inclined in such a direction that the angle β defined between the incidence plane 15a and the non-incidence plane 15b is reduced. The angle β defined therebetween is about 160°. This is effective in preventing the LED lamp 16 from being directly viewed via the front face 12 of the light guiding member 11. In other words, by inclining the incidence plane 15a, a region can be increased through which the LED lamp 16 cannot be viewed directly. Thus, the design freedom of the front face 12 can be increased to achieve, e.g., the downsizing of the light guiding member 11. Further, the inclination of the incidence plane 15a allows an increase in number and area of the reflecting portion 13a. The increase in number and area of the reflecting portion 13a can contribute to equalize the brightness. The angle β defined between the incidence plane 15a and the non-incidence plane 15b is not specially limited and may be, e.g., 120° to 180°.

Although in the above embodiments light is introduced from the bottom side of the light guiding member 11, it may be introduced from the top side or lateral side of the light guiding member 11.

In the above embodiments, the form of the rear face 13 of the light guiding member 11 and the thickness of the light guiding member 11 are exemplified but may be optionally designed or determined if the effects can be obtained that the light source is hard to view from outside and the illumination is conducted with the enhanced visual effects.

The material of the light guiding member 11 is not specially limited and may be a transparent or translucent material with a refractive index of about 1.4 to 1.8. For example, it may be a polycarbonate resin, an epoxy resin, glass as well as the acrylic resin used in the above embodiments.

INDUSTRIAL APPLICABILITY OF THE INVENTION

The invention can be applied to lighting systems for various vehicles such as a passenger car, a bus, a truck etc. For example, the invention can be applied to rear combination lamps, tail lamps, stop lamps, high mount stop lamps, head lamps etc.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle lighting system, comprising:
   a light guiding member, comprising:
      a convex curved front face as a light emitting surface;
      a rear face comprising a plurality of reflecting portions inclined to the convex curved front face; and
      a side face, comprising:
         an incidence surface through which a light from a light source disposed opposite to the side face enters into the light guiding member;
         a non-incidence surface which connects the incidence surface and the convex curved front face and through which the light from the light source does not enter into the light guiding member; and
         a step formed between the incidence surface and the non-incidence surface,
   wherein an angle θ defined between the convex curved front face and the side face is such that an external light entering the light guiding member through the convex curved front face and traveling directly to the side face is totally reflected by the side face,
   wherein said convex curved front face comprises:
      a straight portion that contacts and extends from said side face; and
      a curved portion that contacts and extends from said rear face and contacts said straight portion,
   wherein the light guiding member comprises as a whole nearly a triangle form in section, and
   wherein an angle β defined between said incidence surface and said non-incidence surface is in a range of 120° to 180°.

2. The vehicle lighting system according to claim 1, wherein the angle θ meets the relationship $\theta > 2 \sin^{-1}(1/n)$, where n is a refractive index of the light guiding member.

3. The vehicle lighting system according to claim 1, wherein the angle θ meets the relationship $\theta > 2 \sin^{-1}(1/n) - 10°$, where n is a refractive index of the light guiding member.

4. The vehicle lighting system according to claim 1, wherein a mirror image of the light source mirrored on the plurality of reflecting portions is viewed via the convex curved front face from outside.

5. The vehicle lighting system according to claim 1, wherein a light to enter into the light guiding member via the side face from the light source is irradiated to all of the plurality of reflecting portions.

6. The vehicle lighting system according to claim 1, wherein each of the plurality of reflecting portions comprises a convex curved surface.

7. The vehicle lighting system according to claim 6, wherein said convex curved surface of each of said plurality of reflecting portions is inclined to said incidence surface at an angle $\alpha$ in a range of 40° to 50°.

8. The vehicle lighting system according to claim 1, wherein the incidence surface comprises a smooth surface.

9. The vehicle lighting system according to claim 1, wherein a distance of the convex curved front face and the rear face is one of continuously decreased and stepwise decreased with distance from the side face.

10. The vehicle lighting system according to claim 1, wherein the side face comprises a thickness in a range of 15 mm to 50 mm.

11. The vehicle lighting system according to claim 1, wherein the light guiding member is placed such that the side face is located at a bottom of the light guiding member.

12. The vehicle lighting system according to claim 1, wherein the light source comprises an LED (light emitting diode) lamp.

13. The vehicle lighting system according to claim 1, wherein said curved portion contacts said straight portion at a position where said curved portion and straight portion are each at a furthest point from said rear face.

14. The vehicle lighting system according to claim 1, wherein said curved portion and said straight portion continually extend outward and away from said rear face.

15. The vehicle lighting system according to claim 1, wherein said curved portion and said straight portion form obtuse angles with said rear face and said side face, respectively.

16. The vehicle lighting system according to claim 1, wherein the light source is other than directly viewable via the convex curved front face of the light guiding member.

17. The vehicle lighting system according to claim 1, wherein the plurality of reflecting portions is arrayed in a lateral direction such as to displace each of the plurality of reflecting portions half a height of the plurality of reflecting portions from an adjacent one of the plurality of reflecting portions in a vertical direction.

18. The vehicle lighting system according to claim 1, wherein said non-incidence surface is parallel to said incidence surface.

19. The vehicle lighting system according to claim 1, wherein a surface area of said curved portion of said convex curved front face is greater than a surface area of said straight portion of said convex curved front face.

20. The vehicle lighting system according to claim 1, wherein said rear face further comprises a plurality of nonreflecting portions that are formed alternately with said plurality of reflecting portions and connect adjacent portions of said plurality of reflecting portions, said plurality of nonreflecting portions having a surface that is substantially perpendicular to said incidence plane.

* * * * *